May 14, 1963  F. E. J. WILSON  3,089,616
LIQUID DISPENSING APPARATUS
Filed Nov. 3, 1960  11 Sheets-Sheet 1

FREDERICK E. J. WILSON INVENTOR

BY *Imirie & Smiley*

ATTORNEYS

INVENTOR
FREDERICK E. J. WILSON

May 14, 1963  F. E. J. WILSON  3,089,616
LIQUID DISPENSING APPARATUS
Filed Nov. 3, 1960  11 Sheets-Sheet 3

INVENTOR
FREDERICK E. J. WILSON
BY *Imirie & Smiley*
ATTORNEYS

May 14, 1963  F. E. J. WILSON  3,089,616
LIQUID DISPENSING APPARATUS
Filed Nov. 3, 1960  11 Sheets-Sheet 4

FREDERICK E. J. WILSON  INVENTOR
BY
ATTORNEYS

May 14, 1963  F. E. J. WILSON  3,089,616
LIQUID DISPENSING APPARATUS
Filed Nov. 3, 1960  11 Sheets-Sheet 5

INVENTOR
FREDERICK E. J. WILSON
BY *Imrie & Smiley*
ATTORNEYS

May 14, 1963  F. E. J. WILSON  3,089,616
LIQUID DISPENSING APPARATUS
Filed Nov. 3, 1960  11 Sheets-Sheet 6

INVENTOR
FREDERICK E. J. WILSON
BY
ATTORNEYS

May 14, 1963 — F. E. J. WILSON — 3,089,616
LIQUID DISPENSING APPARATUS
Filed Nov. 3, 1960 — 11 Sheets-Sheet 7

INVENTOR
FREDERICK E. J. WILSON
BY
ATTORNEYS

INVENTOR
FREDERICK E. J. WILSON
BY *Imirie & Smiley*
ATTORNEYS

May 14, 1963     F. E. J. WILSON     3,089,616
LIQUID DISPENSING APPARATUS
Filed Nov. 3, 1960     11 Sheets-Sheet 9

FREDERICK E. J. WILSON    INVENTOR

BY *Imirie & Smiley*

ATTORNEYS

May 14, 1963  F. E. J. WILSON  3,089,616
LIQUID DISPENSING APPARATUS
Filed Nov. 3, 1960  11 Sheets-Sheet 11

INVENTOR
FREDERICK E. J. WILSON
BY
ATTORNEYS 3,089,616
LIQUID DISPENSING APPARATUS
Frederick Edward John Wilson, Chessington, England, assignor to Avery-Hardoll Limited, Chessington, England
Filed Nov. 3, 1960, Ser. No. 66,981
Claims priority, application Great Britain Nov. 6, 1959
6 Claims. (Cl. 222—16)

This invention relates to liquid dispensing apparatus, and more particularly to such apparatus of the kind in which a meter through which the liquid is passed during the dispensing operation drives a mechanism, settable according to the quantity of liquid required to be dispensed, which mechanism closes a valve to terminate the operation when the required quantity of liquid has passed through the meter.

The object of the invention is to provide an improved settable mechanism, particularly for dispensing apparatus for delivering liquid in large quantities from a bulk storage or transport container, such quantities consisting, for example of several hundreds or even some thousands of gallons.

According to the present invention, in liquid dispensing apparatus including a displacement meter, drum type counter means manually settable to show the quantity of liquid to be dispensed and driven by said meter to return them to the zero position, a valve opened manually and closed automatically by means operated by the return of said counter means to the zero position to stop the flow of liquid through the meter and a clutch to disengage the drive to said counter means from said meter each higher order drum of the said counter means is driven from the next lower order drum through a transfer gear and some or all of said transfer gears are movable out of mesh with co-operating gears on the drums to release the drums for individual setting.

Detent means are preferably provided to locate the said drums accurately for re-engagement of the transfer gears therewith.

The transfer gear driving the second order drum from the lowest order drum may remain constantly in mesh so that one drum is set by rotation of the other, the transfer gears driving the further higher order drums being movable and each such drum being provided with individual setting means.

Means may be provided for simultaneously releasing the clutch and moving the transfer gears to release the drums.

Interlocking means may be provided to prevent opening of the valve when the transfer gears are moved to release the drums for individual setting, and to prevent movement of the transfer gears when the valve is open.

The invention is hereinafter described with reference to the accompanying drawings, in which.

Figures 1, 12:
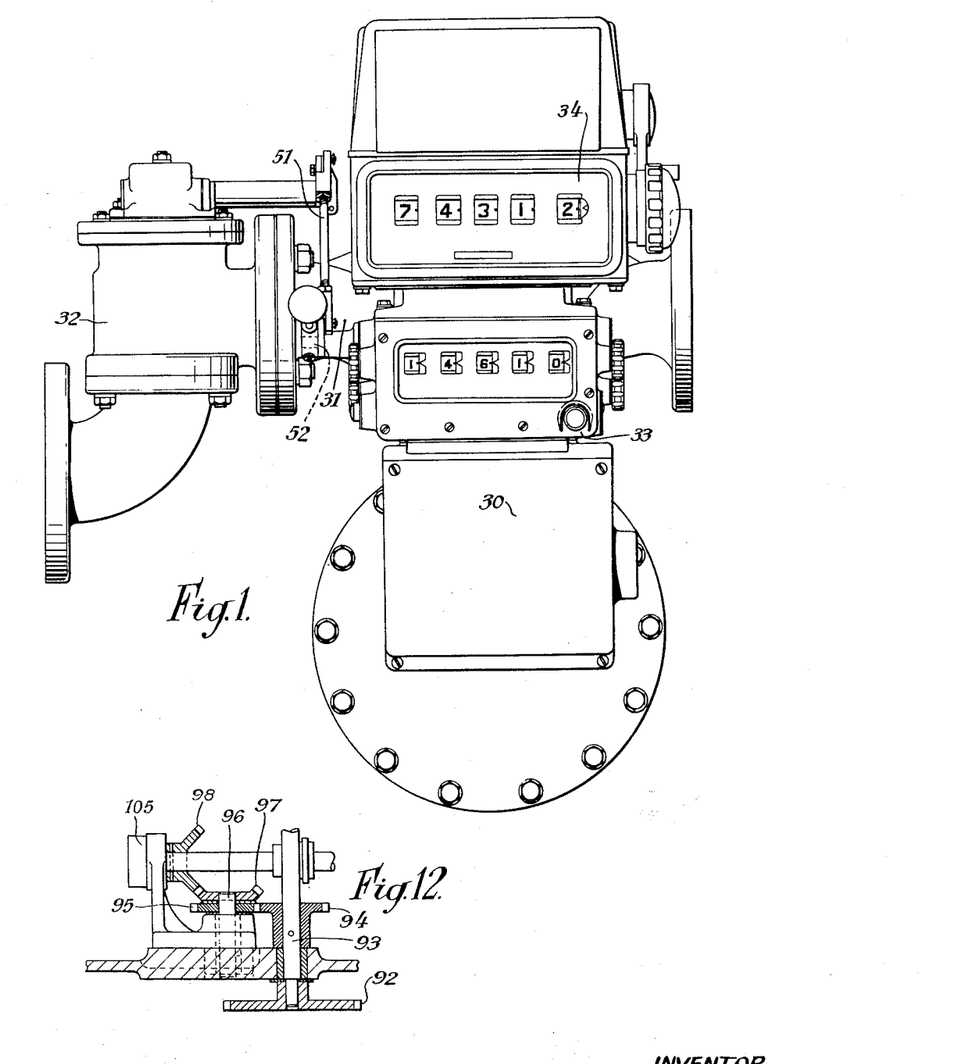
FIGURE 1 is a front elevation of one arrangement of apparatus according to the invention.
FIGURE 12 is a scrap section on the line 12—12 of FIGURE 9.

Referring to the drawings, and more particularly to FIGURE 1 thereof, a liquid meter 30 of the displacement type having a rotor (not shown) driven by the liquid flowing through it, receives liquid pumped to it from a storage tank in the usual manner, neither the pump nor the storage tank being shown. The liquid leaves the meter through a conduit 31 and valve 32 from which it passes through a delivery conduit (not shown) to the container to be filled.

The meter, as will be hereinafter described, drives a settable mechanism 33 controlling the valve 32, and also drives a volume register 34 showing the quantity of liquid delivered.

Figures 2, 3:
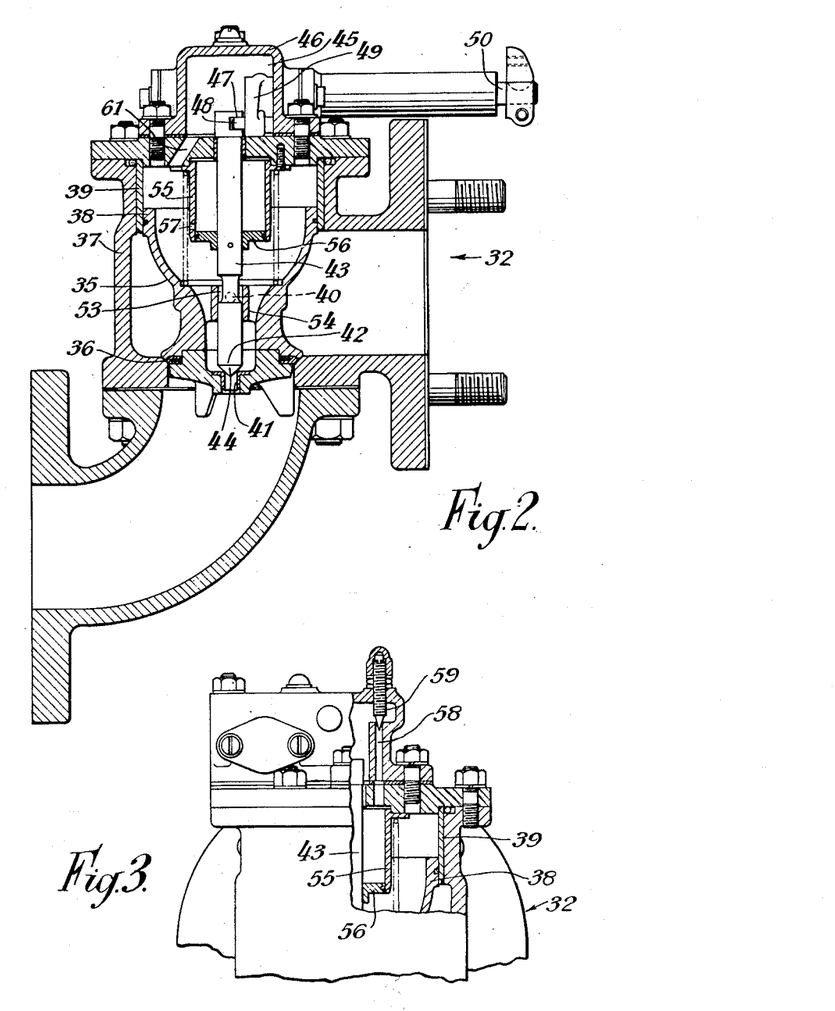
FIGURE 2 is a sectional elevation of the valve which is closed to terminate the delivery of liquid.
FIGURE 3 is a sectional elevation showing a detail of the valve shown in FIGURE 2.
Figure 4:
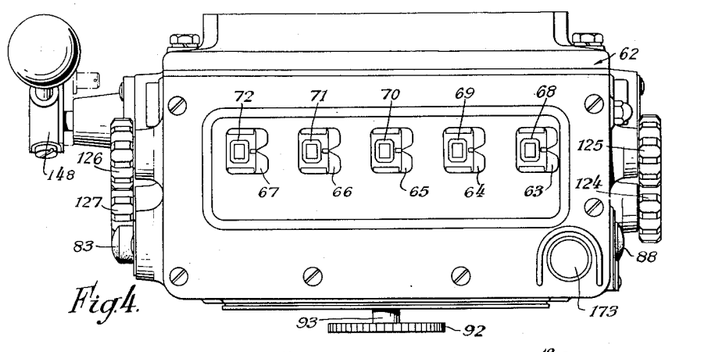
FIGURE 4 is a front elevation, on a larger scale, of the settable mechanism.
Figure 5:
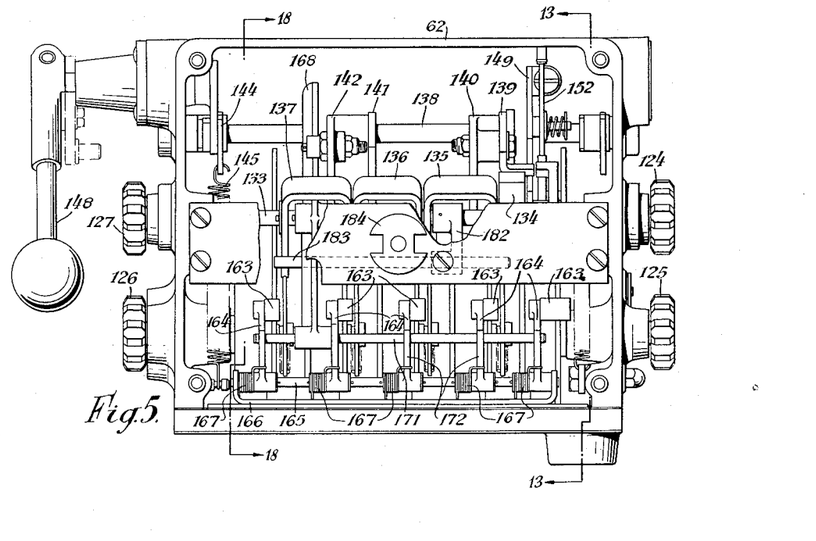
FIGURE 5 is a plan view of the settable mechanism with the cover removed.
Figure 6:
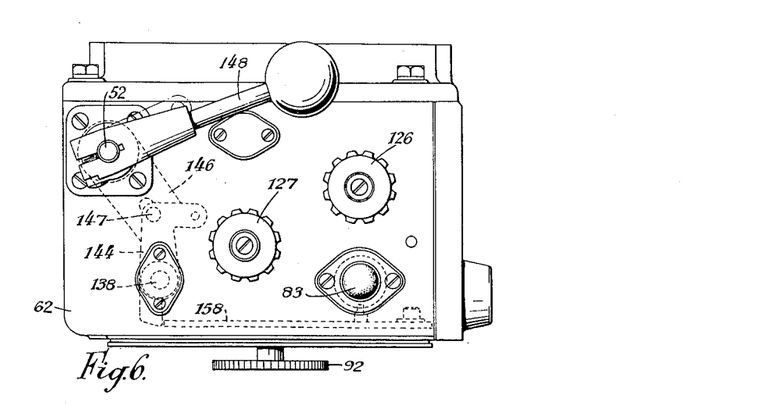
FIGURE 6 is an end view of the settable mechanism looking from the left-hand end in FIGURE 5.
Figure 7:
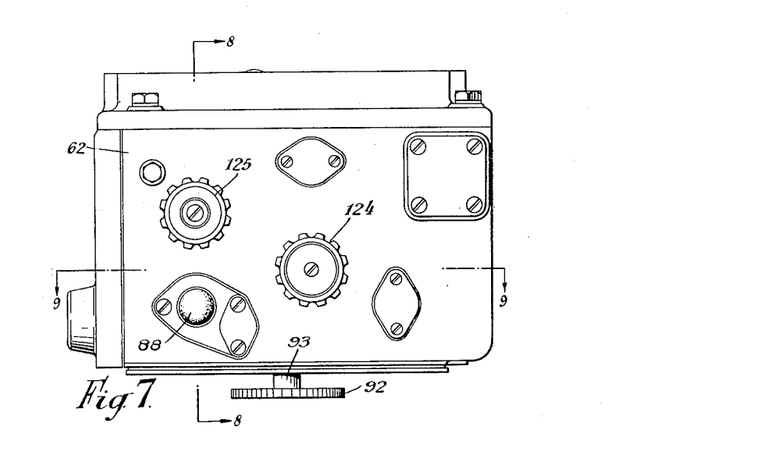
FIGURE 7 is an end view of the settable mechanism looking from the right-hand end in FIGURE 5.

The valve 32, FIGURES 2 and 3, is pilot operated, and comprises a main valve closure member 35 co-operating with a seat 36 in a valve housing 37 to close the passage therethrough, the closure member 35 having a piston portion 38, of larger diameter than the valve seat 36, slidable in a cylinder 39 constituting a control chamber capable of receiving liquid from the upstream side of the valve through a radial passage 40 in the closure member 35 and connected to the downstream side of the valve by an orifice 41 controlled by a pilot valve 42. The pilot valve 42 comprises a stem 43 having a conical tip 44 to close the orifice 41, the stem being slidable in guides in the main valve closure member 35 and extending through the control chamber 39 into a chamber 45, closed by a cap 46. The end of the stem 43 which projects into the chamber 45 is slotted at 47 to receive a crank pin 48 on a crank 49 mounted on one end of a shaft 50 coupled by a linkage 51 (FIGURE 1) to a shaft 52 projecting from the settable mechanism 33.

The stem 43 of the pilot valve has an annular groove 53, and the radial passage 40 opens into a guide 54 for the said stem in such a position that, when the pilot valve is closed, as shown in FIGURE 1, the radial passage 40 is opposite the groove 53 and so is freely connected to the control chamber 39, whereas when the pilot valve is open, the said passage is covered by the stem 43. The passage 40 extends through a web supporting the guide 54 into the space surrounding the valve closure member. A sleeve 55 fixed in the control chamber 39 has slidable in it a piston 56 fixed to the stem 43, the interior of the sleeve 55 being connected to the control chamber by a port 57 adjacent its lower end, and also through a passage 58 (FIGURE 3) controlled by an adjustable needle 59, leading into the chamber 45, and a passage 61 connecting the chambers 45 and 39.

Figure 8:
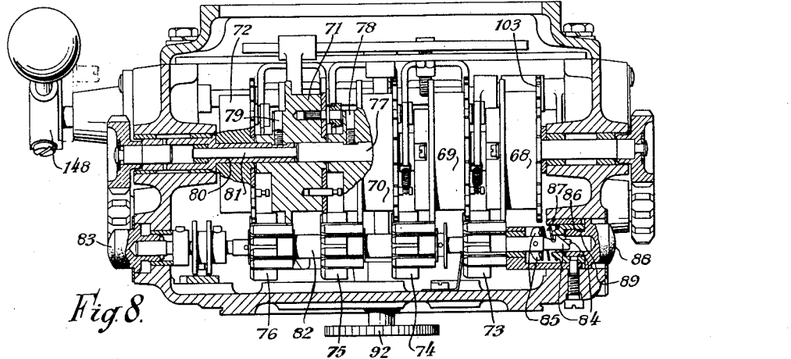
FIGURE 8 is a section on the line 8—8 of FIGURE 7.
Figure 11:
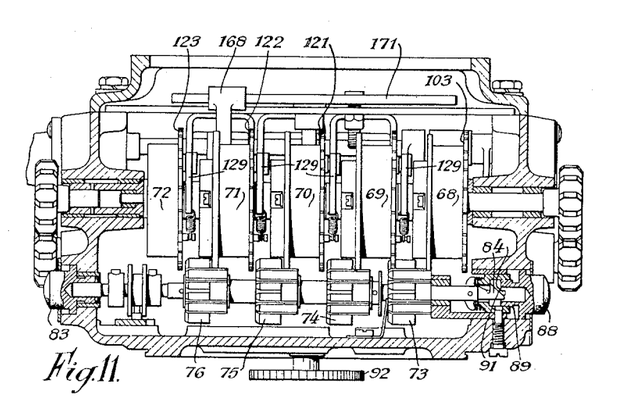
FIGURE 11 is a section similar to FIGURE 8, showing the parts in another position.

The settable mechanism, which is shown in FIGURES 4 to 21 comprises a casing 62 having windows 63, 64, 65, 66 and 67 in its front wall through which are visible numerals on the peripheries of counter drums 68, 69, 70, 71 and 72 respectively, hereinafter called the units, tens, hundreds, thousands and tens of thousands drums respectively. These drums as shown in FIGURES 8 and 11 (the numerals being omitted from the figures), are mounted on a common axis, and each of the tens, hundreds, thousands and tens of thousands drums is driven from the next lower order drum through a transfer gear wheel in the known manner, the transfer gear wheels being shown at 73, 74, 75 and 76.

The units and tens drums 68 and 69 are mounted freely on a shaft 77 extending into the casing 62 from the right-hand end, and the hundreds drum 70 is fixed to the shaft 77 by a set screw 78. The thousands drum 71 is fixed, by a set screw 79 to a tubular shaft 80 extending into the casing 62 from the left-hand end and receiving a reduced end portion 81 of the shaft 77, and the tens of thousands drum 72 is rotatably mounted on the tubular shaft 80.

The transfer gear wheels 73, 74, 75 and 76 are mounted on a shaft 82 slidable longitudinally in the casing 62, the transfer gear wheel 73 being rotatable on the shaft 82 and being held against sliding movement whilst the transfer gear wheels 74, 75 and 76 are both rotatable on and slidable with the said shaft. A push button 83 is provided at the left-hand end of the casing 62, and is operable to move the shaft 82 towards the right. At its right-hand end, the shaft 82 has pivotally mounted on it, so as to be rockable in a diametral plane of the said shaft, a pair of hook members 84 (FIGURE 8) each formed with a radially projecting tail 85. The hook members 84 lie within a stepped sleeve 86 and, when the shaft 82 is moved to the right, the hook members 84 are moved outwardly by a coiled compression spring 87 acting between the tails 85 and the end of the sleeve, to engage the step in the sleeve 86 and hold the shaft against return movement, as shown in FIGURE 11.

A second push-button 88 is provided at the right-hand end of the casing 62, the push-button 88 having a tubular stem 89 which, when the push button is moved inwardly, engages inclined surfaces 91 on the hook members to move them off the shoulder, allowing the shaft 82 to be returned by the spring 87.

Figure 9:
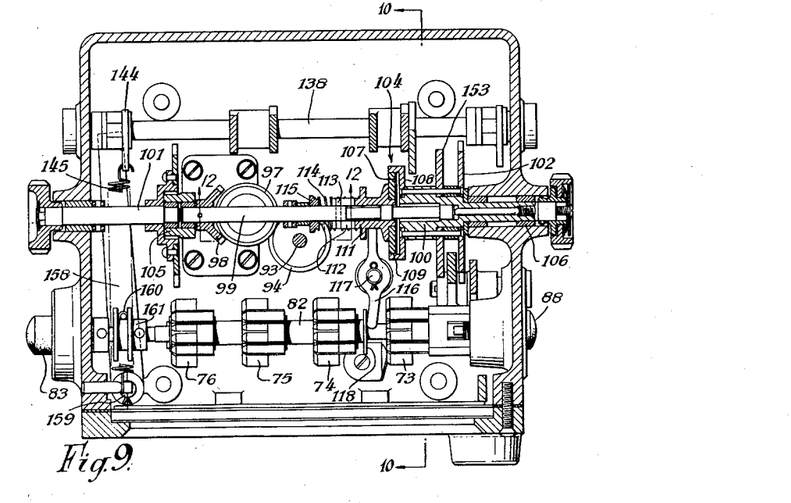
FIGURE 9 is a section on the line 9—9 of FIGURE 7.
Figure 10:
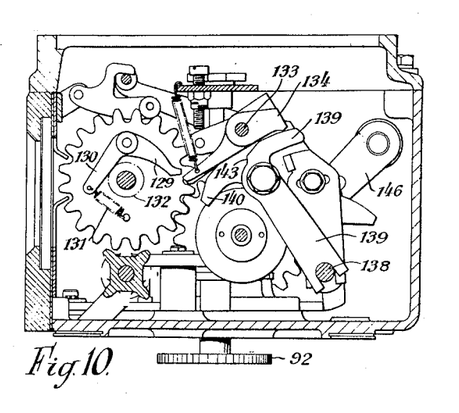
FIGURE 10 is a section on the line 10—10 of FIGURE 9.

The units drum 68 is driven by the meter through gearing which will now be described. The meter shaft (not shown) carries a gear wheel which meshes with a gear wheel 92 on a shaft 93 extending through the bottom of the casing 62, the shaft 93, as shown in FIGURES 9 and 12, carrying a gear wheel 94 meshing with another gear wheel 95 on a suitable stub shaft 96, the gear wheel 95 having fixed to it a bevel pinion 97 meshing with another bevel pinion 98 fixed on the central portion 99 of a divided shaft 99, 100, 101, extending through the casing parallel to the axis of the counter drums.

The portion 100 of this divided shaft carries a gear wheel 102 meshing with a driving gear 103 fixed to the counter drum 68, and a releasable clutch 104 is provided between the shaft portions 99 and 100.

The shaft portion 99 extends into a coaxial bore in the shaft portion 100 at one end, and is journalled at its other end in a bracket 105 fixed to the bottom of the casing 62. The shaft portion 100 is journalled in a bearing 106 in the right-hand end wall of the casing 62. The clutch 104, which is shown in FIGURES 9, and 15 to 17 comprises a driving member 107 slidable on the shaft portion 99 and a driven member 108 fixed on the shaft portion 100. The clutch driving member 107 is a non-circular plate, shown in the drawing as being square, having the edges at its corners inclined slightly to the shaft axis. The clutch driven member 108 is a disc having a frusto-conical recess 109 in one face to receive the driving member 107, the cone angle of the recess being substantially equal to the angle to the axis of the edges of the driving member 107. The driving member 107 is mounted on a hub 111 slidable on the shaft portion 99 and slotted longitudinally at 112 to engage a diametral pin 113 passing through the shaft portion 99, and is urged into the recess in the driven member by a coiled compression spring 114 taking its abutment on a collar 115 fixed to the said shaft portion.

A two-armed lever 116 pivoted at 117 on a post upstanding from the bottom of the casing 62 has one end engaged by a flange 118 on the slidable shaft 82, and its other end engaged with a flange 119 on the hub 111 of the clutch driving member, the arrangement being such that when the slidable shaft 82 is moved to the right the transfer gear wheels 74, 75 and 76 are disengaged from co-operating gear wheels 121, 122, 123 on the drums 70, 71 and 72, and the clutch 104 is disengaged. Thus pressing of the push-button 83 disengages the drive from the meter to the units drum 68 and disengages the drive to each of the drums 70, 71 and 72 from the respective next lower order drums, leaving the tens drum 69 with a driving connection to the units drum 68.

The drums 70, 71 and 72 can then be set individually to any desired position, and the drum 68 can be rotated to set itself and the drum 69 to any desired position. The drum 68 is rotated for setting by a knob 124 on the outer end of the shaft portion 100 and transmits rotation to the drum 69 through the transfer gear wheel 73. The drum 70, being fixed to the shaft portion 77, is rotated for setting by a knob 125 on the said shaft portion 77, and the drum 71 is rotated for setting by a knob 126 on the tubular shaft 80. The drum 72 is rotated for setting by a knob 127 on the shaft portion 101, that shaft portion carrying a gear wheel 128 which meshes with the gear wheel 123 fast with the drum 72.

Each of the counter drums 69, 70, 71, 72 has pivotally mounted on it, about an axis eccentric with respect to the drum, a pawl 129 having a tail 130 which is urged by a tension spring 131 against a cylindrical surface 132 on the next adjacent drum, so that the pawl can rock in one direction from the position in which it is held by the spring, but not in the opposite direction. A shaft 133 extending parallel to the axis of the counter drums has freely rotatable thereon four abutment members 134, 135, 136 and 137 to co-operate respectively with the pawls 129 on the drums 69, 70, 71 and 72, the latch member 134 being shown in end view FIGURE 10, and the abutment member 137 which is identical with the abutment members 135 and 136, being shown in end view in FIGURES 18 and 19. The abutment members 135, 136 and 137 each comprise a metal strip bent to U-shape and having both of its limbs apertured to receive the shaft 133, one limb of each abutment member being extended into the path of the co-operating pawl 129. The abutment member 134 has a similar limb extending into the path of the pawl 129 on the drum 69. All of the abutment members 134, 135, 136 and 137 are urged about the shaft in a direction to rock their extended limbs upwardly, the pawls 129, when the drums are in their zero positions, restraining the latch members against such movement.

Figure 18:
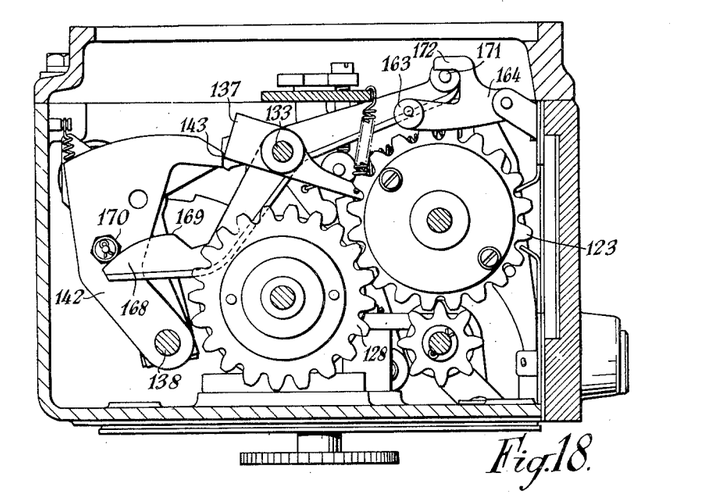
FIGURE 18 is a section on the line 18—18 in FIGURE 5, showing the positions of various parts when the valve is open.

Another shaft 138 extending parallel to the drum axis, carries four latch members 139, 140, 141, 142 to co-operate respectively with the abutment members 134, 135, 136 and 137, each latch member having a face 143 which, when the corresponding abutment member is released by turning of the appropriate drum away from the zero position, can engage the said abutment member as shown in FIGURE 18. The shaft 138 also has fixed to it a crank 144 on which a tension spring 145 (FIGURES 5 and 9) acts to rotate the said shaft, the engagement of any latch member with its corresponding abutment member preventing such rotation. The shaft 52 which is connected by the linkage 51 to the valve operating shaft 50 carries a longitudinally slotted arm 146 in the slot of which is engaged a pin 147 on the crank 144, so that turning of the shaft 138 causes turning of the valve operating shaft 50, and a handle 148 is also mounted on the shaft 52 so that it can be turned by hand.

The tension spring 145 acts to turn the shaft 138 in a direction to close the valve 32, and the abutment members 134, 135, 136 and 137, when their respective co-operating drums are not in the zero positions co-operate with the latch members 139, 140, 141 and 142 to hold the shaft 138 in a position such that the valve is open. The latch members are so arranged that only one of them is in engagement with its associated abutment member at any time, the abutment engaging surfaces on the latch members being offset one from another in a circumferential direction about the axis of the shaft 138 so that if the latch member 142 associated with the tens-of-thousands drum 72 is in engagement with the abutment member 137, the latch members 141, 140 and 139 are spaced by small but progressively increasing distances from the abutment members 136, 135 and 134, each of the latter latch members in turn coming into engagement with its associated abutment member when the preceding one is released.

The shaft 133 carries, in addition to the abutment members, an arm 149 extending towards the rear wall of the casing 62 and urged upwardly by a tension spring 151. The arm 149 carries a counterweighted pawl 152 cooperating with a notched disc 153 mounted on the shaft portion 100 carrying the clutch driven member 108. A lug 154 on the latch member 139 co-operates with a cam edge 155 on the arm 149 to hold the said arm 149 in a depressed position when the shaft 133 is in the valve-closed position, allowing the arm 149 to rise when the valve is opened to bring the pawl 152 clear of the edge of the disc. The cam edge 155 includes a step 156 against which the lug 154 abuts when the latch member 139 is released to press the pawl 152 against the edge of the disc 153, and hold the shaft 133 against further movement until the pawl comes opposite the notch in the disc. A stop 157 is provided on the arm 149 to limit movement of the pawl under the influence of the counterweight.

Figure 21:
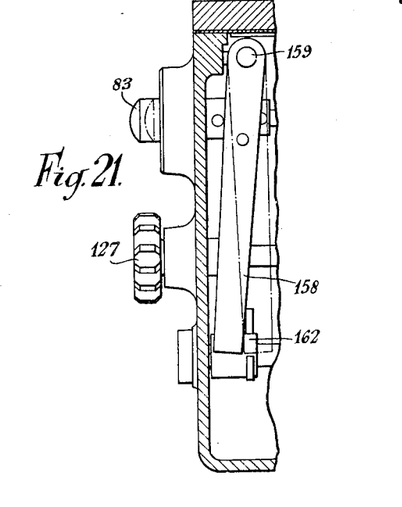
FIGURE 21 is a detail view of the interlocking mechanism looking from the underside.
Figure 22:
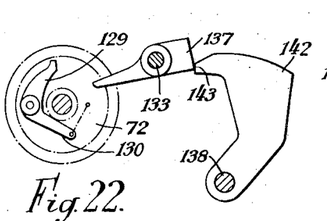
FIGURES 22 to 29 are explanatory diagrams showing the operation of the latch members by the counter drums.

Interlocking mechanism is provided to prevent the setting of the counter drums from being changed whilst the valve is open, and to prevent the valve from being opened whilst the drums are released for setting. This interlocking mechanism is shown in FIGURES 9 and 21 and comprises an arm 158, pivoted at 159 in the bottom of the casing 62, the arm being provided adjacent its pivot with an upstanding pin 160 engaging between two flanges on a collar 161 fixed to the shaft 82. The free end of the arm 158 co-operates with a lug 162 on the boss of the crank 144, the arrangement being such that, when the shaft 82 is in its normal position, so that the transfer gear wheels are in their driving positions, and the valve is open, the lug 162 lies in the path of the arm 158 and prevents the shaft 82 from being moved longitudinally. When the valve is closed, and the shaft 82 has been moved to disengage the transfer gear wheels, the end of the arm 158 lies in the path of the lug 162, thus preventing the shaft 138 from being turned to open the valve.

To facilitate accurate location of the counter drums during setting, spring-loaded detents 163 are provided which engage with the teeth of the driving gear wheels fast with the drums. The detents 163 are carried by arms 164 pivoted on a spindle 165 mounted in a bracket 166 fixed to the front wall of the casing 62, and the spring loading of the detents is provided by torsion springs 167. In order to reduce the resistance to rotation of the drums during delivery of liquid, the detents are lifted clear of the gear wheels when the valve is opened, an arm 168, pivoted on the shaft 133 having a cam edge 169 acted on by a roller 170 mounted on the latch member 142 to rock the said arm 168 when the valve is opened, and, through a rod 171 extending underneath hooked lugs 172 on all the detent arms 164, to lift the detents clear of the gear wheels.

Figure 13:
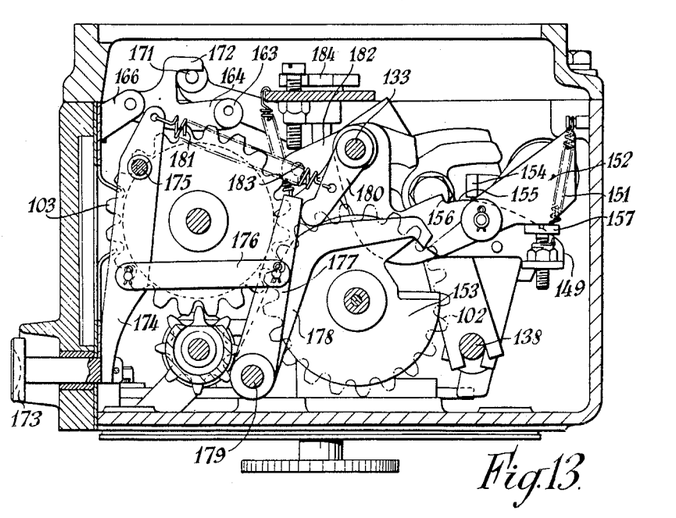
FIGURE 13 is a section on the line 13—13 of FIGURE 5.
Figure 14:
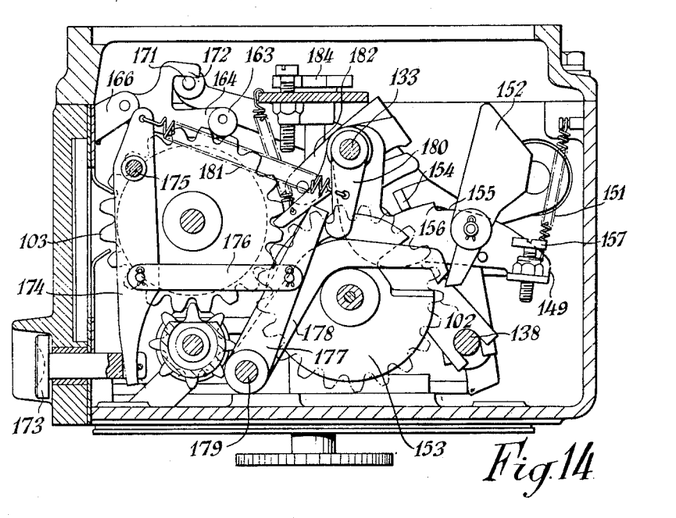
FIGURE 14 is a section similar to FIGURE 13 but showing the parts in another position.
Figure 15:
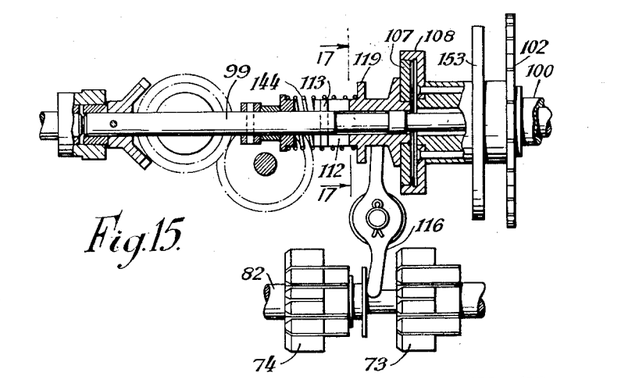
FIGURE 15 is an enlarged sectional view corresponding to part of FIGURE 9 and showing the clutch in the engaged position.

Emergency closing means are provided to enable the valve to be closed at any time during delivery, regardless of the position of the counter drums, said means being operated by a push-button 173 on the front of the casing 62. The push-button 173, as shown in FIGURES 13 and 14, acts on the lower end of a lever 174 pivoted at 175 in the casing 62. A link 176 pivoted to the lever 174, is pivoted at its other end to one of two rigidly connected arms 177, 178 pivoted at 179 in the casing 62, the arm 177, to which the link 176 is connected acting at its free end on an arm 180 fixed to the shaft 133, whilst the arm 178 co-operates with the pawl 152. A tension spring 181 extending between the lever 174 and the arm 180 acts to move the push-button outwardly and to hold the arm 178 clear of the pawl 152. Another arm 182 fixed to the shaft 133 carries a rod 183 which, when the push-button 173 is pressed, acts downwardly on the tails of the abutment members to move them out of the paths of the latch members, the arm 178 at the same time moving the pawl 152 clear of the disc 153, so that the shaft 138 is free to move in the valve closing direction.

The shaft 93 extends upwardly through the casing 62 and carries at its upper end the driving member 184 of a dog clutch for driving the volume register 34.

The operation of the apparatus will now be described.

Figure 23:
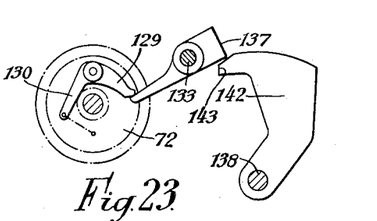
Figure 24:
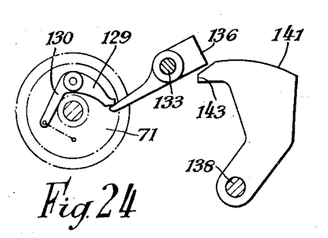
Figure 25:
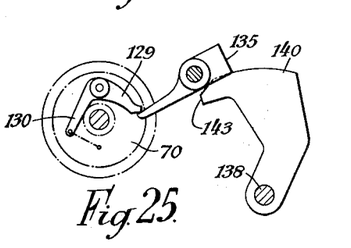
Figure 26:
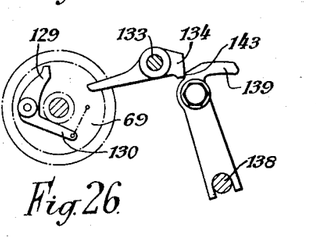
Figure 27:
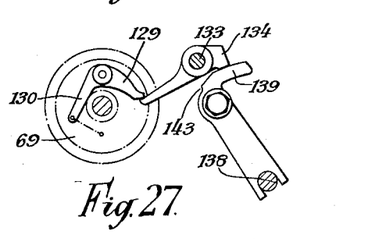
Figure 29:
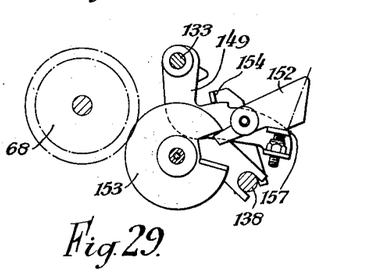

When the apparatus is idle, having completed a delivery of liquid and not been set for another delivery, the counter drums 68 to 72 are in their zero positions, and all the pawls 129 are in positions such as are shown in FIGURES 23, 25 and 27, so that the abutment members 134, 135, 136 and 137 have their tails held down by the said pawls, and the latch members 139, 140, 141 and 142 can move freely past the said abutment members, allowing the shaft 138 to take up the position in which the valve is fully closed. The latch members 142, 140 and 139 are shown in these positions in FIGURES 23, 25 and 27 respectively. The nose of the pawl 152 lies opposite the notch in the disc 153 (as shown in FIGURE 29) so that this pawl also offers no obstruction to the valve closing movement of the shaft 138, and the valve is accordingly closed.

Figure 19:
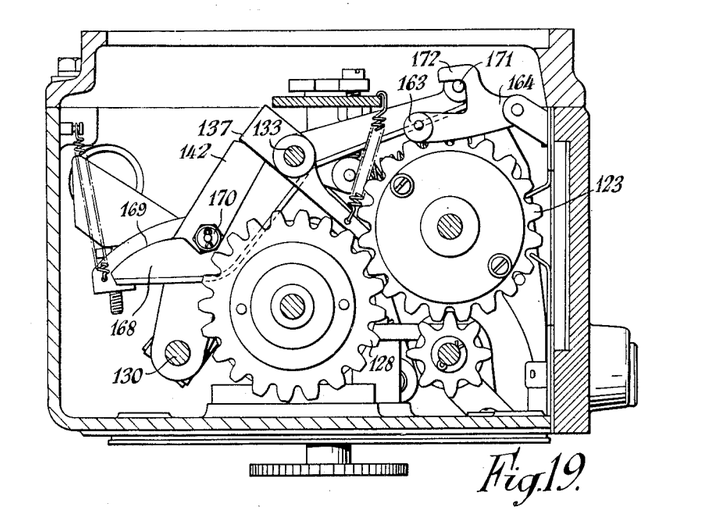
FIGURE 19 is a section corresponding to FIGURE 18 but showing the parts in the positions they take up when the valve is closed.

The shaft 82 is in its position towards the left, so that the transfer gear wheels 73, 74, 75, 76 are in mesh with the gears on the counter drums 69 to 72, as shown in FIGURE 8, and the clutch 104 is engaged. The detents 163 are in engagement with the teeth of the gear wheels on the counter drums, as shown in FIGURE 19.

Figure 16:
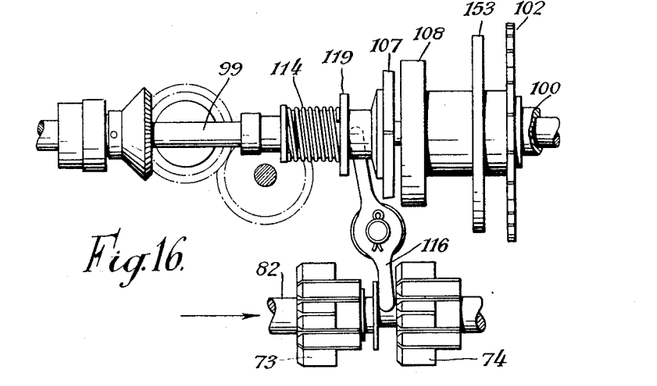
FIGURE 16 is a view similar to FIGURE 15 but with the parts in elevation and showing the clutch disengaged.
Figure 17:
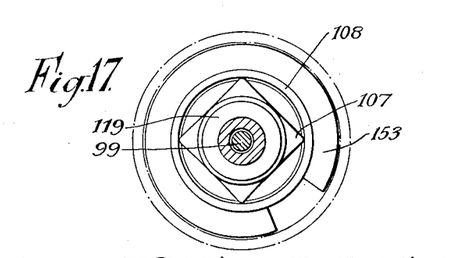
FIGURE 17 is a section on the line 17—17 of FIGURE 16.

To set the apparatus for the delivery of a quantity of liquid, the push-button 83 is first pressed to move the shaft 82 towards the right and disengage the transfer gear wheels 74, 75 and 76 from the gear wheels on the hundreds, thousands and tens-of-thousands drums 70, 71 and 72 respectively, and also to disengage the clutch 104 through the lever 116, and set the interlocking arm 158 to prevent movement of the shaft 138, the transfer gear wheels being shown in this position in FIGURE 11 and the clutch in FIGURE 16.

Figure 20:
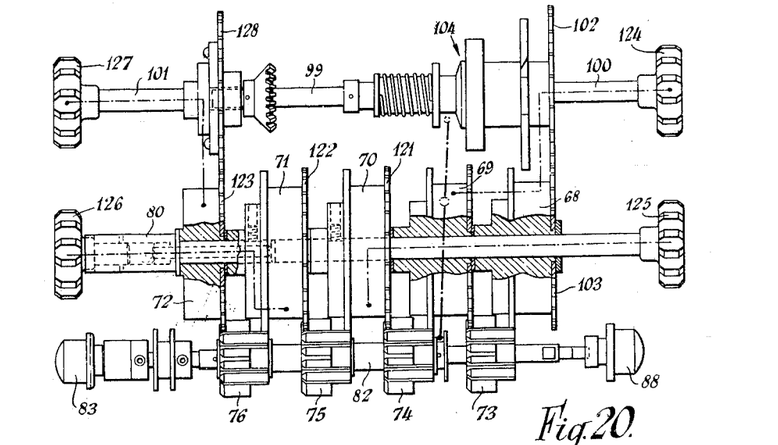
FIGURE 20 is a diagram showing the interconnection of the various setting knobs to the respective counter drums.

Assuming that a quantity of 12,345 gallons of liquid is required to be delivered, the knobs 124, 125, 126 and 127 are turned to set the drums to bring the required numerals into the windows, the connections of the knobs to the various drums being shown in FIGURE 20. Thus the knob 124 is rotated to turn the drum 68, and, through the transfer gear wheel 73, the drums 69, until these drums show the numerals 5 and 4 respectively, the knob 125 is rotated to bring the numeral 3 on the drum 70 into the window, and the knobs 126 and 127 respectively are rotated to bring the numerals 2 and 1 on the drums 71 and 72 opposite the windows.

The push-button 88 is then pressed to release the shaft 82 and re-engage the clutch, at the same time re-engaging the transfer gear wheels with the gears on the counter drums, and removing the arm 158 from the path of the lug 162 so that the shaft 138 is free to turn.

The handle 148 is then operated to turn the shaft 138, causing the latch members 139 to 142 to turn about the axis of that shaft clockwise from the positions shown in FIGURES 23, 24, 25 and 27. Since the abutment members 134 to 137 have been released by the movement of the pawls 129 with rotation of the counter drums from their zero positions, the said abutment members, before the handle is operated, rest on the curved upper edges of the latch members and, as the shaft 138 is turned to open the valve, each latch member in turn moves clear of the associated abutment member, and the latter drops into the return path of the face 143 of the latch member. As described above, the faces 143 are offset one with relation to another, so that only the face 143 on the latch member 142 associated with the tens-of-thousands drum 72 engages its associated abutment member the faces 143 of the other latch members being spaced from the abutment members by distances which increase with the decreasing order of the drums. The turning of the shaft 138 to open the valve also allows the arm 155 to rock under the influence of the spring 151 to lift the nose of the pawl 152 out of the notch in the disc 153, and, by the action of the roller 170 on the cam edge 169 of the lever 168, lifts the detents 163 clear of the gear wheels fixed to the counter drums.

The valve 32 is opened due to the fact that the turning of the handle 148 lifts the pilot valve 42 clear of the orifice 41 in the main valve closure member 35, and at the same time causes the stem 43 of the pilot valve to close the passage 40. Liquid can therefore escape freely from the control chamber 39 of the valve, and, when the pump is brought into operation, the pressure of the liquid lifts the main valve closure member 35 off its seat.

Delivery then proceeds, the counter drums being driven backwardly by the meter 30 through the clutch 104 until, when 2,345 gallons have been delivered, the tens-of-thousands drum 72 returns to its zero position. During the final movement of this drum 72, the pawl 129 thereon presses down on the limb of the abutment member 137, lifting that abutment member out of the path of the latch member 142, so that the spring 145 turns the shaft 138 slightly to bring the latch member 141 into engagement with the abutment member 136. The movement of the shaft 138 is insufficient to cause substantial closing movement of the valve 32.

Delivery continues until, when another 9,000 gallons have been delivered, the abutment member 136 is similarly displaced by the return of the thousands drum 71 to the zero position, and the latch member 140 is brought into engagement with the abutment member 135 controlled by the hundreds drum 70, after which the delivery of a further 900 gallons causes the abutment member 135 to be displaced, and the latch member 139 engages the abutment member 134 associated with the tens drum 69.

Figure 28:
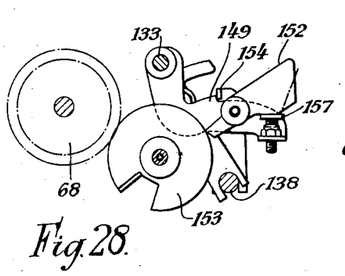

The delivery of another 90 gallons causes the abutment member 134 to be similarly displaced to release the latch member 139 and, when this latch member is released, the shaft 138 is free to move through a substantial angle until the lug 154 engages the step 156 in the cam edge 155 on the arm 149 and presses the nose of the pawl 152 against the edge of the disc 153 as shown in FIGURE 28, the said pawl preventing the arm 149 from moving far enough for the lug 154 to ride over the step 156.

The movement of the pilot valve 42 resulting from the rotation of the shaft 138 at this point is sufficient to restrict the escape of liquid from the control chamber 39 and to open the passage 40, so that the main valve closure member moves towards its closed position, following up the movement of the pilot valve until the latter ceases to move, and thus reducing the opening of the main valve until the rate of flow of the liquid is materially reduced. The movement of the pilot valve is damped by the movement of the piston 56 in the sleeve 55, due to the restriction of entry of liquid into the sleeve past the restrictor 59, so that the change of flow rate is gradual, and does not produce hammer. The new position of the pilot valve is such that a short further movement of the piston would expose the orifice 57.

Delivery continues at the reduced rate of flow until delivery of another 10 gallons of liquid brings the units drum 68 to the zero position when the pawl 152 passes over the edge of the notch in the disc 153 and drops into that notch. In so doing the pawl allows a further movement of the arm 149 so that the lug 154 can ride over the step 156 and permits the shaft 138 to complete its movement in the valve closing direction under the influence of the spring 145. This movement again causes the pilot valve 42 to restrict the orifice 41 and expose the passage 40 so that pressure can build up in the control chamber 39 to complete the closing of the main valve. Immediately after this movement of the pilot valve 42 commences the orifice 57 in the sleeve 55 is exposed so that liquid from the control chamber can enter freely into the sleeve 55 and the final closing of the valve takes place at a rapid rate.

The dashpot action of the piston 56 in the sleeve 55 not only prevents liquid hammer due to a rapid change of the rate of flow of the liquid but also ensures that the shaft 138 is retarded in its rotary movement during the initial closing of the valve and violent impact of the parts which engage one another at the end of this movement is avoided.

The effort necessary to disengage the various latch members is relatively small in view of the fact that only one of them is in engagement at any one time and the movement of the abutment member relative to the latch member is in the plane of the abutment face 143 on the latch member so that only a frictional resistance has to be overcome.

The clutch 104 provides a reliable non-slip driving to the counter drums and remains effective throughout a long life since any wear which takes place is likely to be on the frusto-conical face of the driving member 108 and will merely produce slight grooves which, if anything, will increase the effectiveness of the clutch.

The adjustable needle valve 59 which controls the rate of flow of liquid into the dashpot sleeve 55 enables the rate of closing of the valve to be varied to suit the liquid being delivered and the liquid flow characteristics of the apparatus.

I claim:

1. Liquid dispensing apparatus comprising a displacement meter, drum type counter means including a plurality of drums arranged to indicate a series of digits having several orders constituting a single number and transfer gears cooperating with gears on the drums to transmit motion from each of said drums to the next higher order drum, setting means to set the drums of said counter means to show a quantity of liquid to be dispensed, driving means for said counter means operated by said meter to drive said counter means to the zero position, a valve to control the flow of liquid through said meter, manual opening means for said valve, automatic closing means for said valve operated by the return of the counter means to the zero position, and a clutch in said driving means to free the counter drums for setting, the setting means comprising individual and independently operable setting members connected to separate drums for individually setting more than one drum so that a lower order drum need not be moved to arrive at a desired setting of a higher order drum, and the transfer gears being mounted for movement out of mesh with the cooperating gears on the individually settable drums to release them for setting.

2. Liquid dispensing apparatus comprising a displacement meter, drum type counter means including a plurality of drums arranged to indicate a series of digits having several orders constituting a single number and transfer gears cooperating with gears on the drums to transmit motion from each of said drums to the next higher order drum, setting means to set the drums of said counter means to show a quantity of liquid to be dispensed, driving means for said counter means operated by said meter to drive said counter means to the zero position, a valve to control the flow of liquid through said meter, manual opening means for said valve, automatic closing means for said valve operated by the return of the counter means to the zero position, and a clutch in said driving means to free the counter drums for setting, the setting means comprising individual and independently operable setting members connected to separate drums for individually setting more than one drum so that a lower order drum need not be moved to arrive at a desired setting of a higher order drum, a shaft carrying the transfer gears, bearings in which said shaft is slidable, and means for moving said shaft axially in said bearings to move said transfer gears into and out of mesh with the cooperating gears on the individually settable drums.

3. Liquid dispensing apparatus comprising a displacement meter, drum type counter means including a plurality of drums arranged to indicate a series of digits having several orders constituting a single number and transfer gears cooperating with gears on the drums to transmit motion from each of said drums to the next higher order drum, setting means to set the drums of said counter means to show a quantity of liquid to be dispensed, driving means for said counter means operated by said meter to drive said counter means to the zero position, a valve to control the flow of liquid through said meter, manual opening means for said valve, automatic closing means for said valve operated by the return of the counter means to the zero position, and a clutch in said driving means to free the counter drums for setting, the setting means comprising individual and independently operable setting members connected to separate drums for individually setting more than one drum so that a lower order drum need not be moved to arrive at a desired setting of a higher order drum, the transfer gears transmitting motion to the individually settable drums being mounted for movement out of mesh with the cooperating gears on the drums to release them for setting, and detent means being provided to engage said cooperating gears and locate the drums accurately for reengagement of the transfer gears therewith.

4. Liquid dispensing apparatus comprising a displacement meter, drum type counter means including a plurality of drums arranged to indicate a series of digits having several orders constituting a single number and transfer gears cooperating with gears on the drums to transmit motion from each of said drums to the next higher order drum, setting means to set the drums of said counter means to show a quantity of liquid to be dispensed, driving means for said counter means operated by said meter to drive said counter means to the zero position, a valve to control the flow of liquid through said meter, manual opening means for said valve, automatic closing means for said valve operated by the return of the counter means to the zero position, and a clutch in said driving means to free the counter drums for setting, the setting means comprising individual and independently operable setting members connected to separate drums for individually setting more than one drum so that a lower order drum need not be moved to arrive at a desired setting of a higher order drum, and manual control means acting simultaneously on said transfer gears and on said clutch, to disengage the said transfer gears from the cooperating gears and to release the clutch.

5. Liquid dispensing apparatus comprising a displacement meter, drum type counter means including a plurality of drums arranged to indicate a series of digits having several orders constituting a single number and transfer gears cooperating with gears on said drums to transmit motion from each of said drums to the next higher order drum, setting means to set the drums of said counter means to show a quantity of liquid to be dispensed and comprising individual and independently operable setting members for at least some of the drums, driving means for said counter means operated by said meter to drive said counter means to the zero position, a valve to control the flow of liquid through said meter, a rotary shaft operatively connected to said valve, latch means acting on said shaft to hold said valve in an open position, latch releasing means operated by said drums at their zero positions, a clutch in said driving means, a slidable shaft carrying the transfer gears for transmitting motion to the independently settable drums, manual control means acting simultaneously to slide said shaft to disengage the transfer gears and to release the clutch, and interlocking means comprising members actuated by said rotary shaft and said slidable shaft respectively to prevent opening of said valve when the transfer gears are disengaged and to prevent disengagement of the transfer gears when the valve is open.

6. Liquid dispensing apparatus according to claim 5, wherein the interlocking means comprise a pivoted arm moved by said manual control means and an arm fixed to the rotary shaft, the pivoted arm being arranged to inhibit movement of the arm on the rotary shaft to the valve open position when the transfer gears are disengaged, and the arm on the rotary shaft being arranged to inhibit movement of the pivoted arm to allow sliding of the slidable shaft to disengage the transfer gears when the valve is open.

References Cited in the file of this patent

UNITED STATES PATENTS

| | | |
|---|---|---|
| 1,301,781 | Anderson | Apr. 22, 1919 |
| 2,322,712 | Hazard | June 22, 1943 |
| 2,538,243 | Hazard et al. | Jan. 16, 1961 |

FOREIGN PATENTS

| | | |
|---|---|---|
| 709,932 | Great Britain | June 2, 1954 |
| 737,696 | Great Britain | Sept. 28, 1955 |